(12) United States Patent
Silver et al.

(10) Patent No.: US 7,767,181 B2
(45) Date of Patent: Aug. 3, 2010

(54) SYSTEM AND METHOD FOR AMMONIA PRODUCTION

(75) Inventors: Ronald Silver, Peoria, IL (US); Julie Marie Faas, Peoria, IL (US); Paul Worn Park, Peoria, IL (US); Christie Susan Ragle, Havana, IL (US)

(73) Assignee: Caterpillar Inc, Peoria, IL (US)

( * ) Notice: Subject to any disclaimer, the term of this patent is extended or adjusted under 35 U.S.C. 154(b) by 786 days.

(21) Appl. No.: 11/478,115

(22) Filed: Jun. 30, 2006

(65) Prior Publication Data

US 2008/0003163 A1 Jan. 3, 2008

(51) Int. Cl.
*C01C 1/04* (2006.01)
*F01N 3/20* (2006.01)
*B01D 53/56* (2006.01)
*B01D 53/73* (2006.01)
*F01N 3/28* (2006.01)

(52) U.S. Cl. ............ 423/352; 60/274; 60/276; 60/301

(58) Field of Classification Search ............ 60/286, 60/295, 288, 289, 292, 299, 276, 274, 301, 60/285, 303; 423/352, 360, 362; 123/3; 422/177, 211
See application file for complete search history.

(56) References Cited

U.S. PATENT DOCUMENTS

| | | | |
|---|---|---|---|
| 5,964,088 A | 10/1999 | Kinugasa et al. | |
| 6,047,542 A * | 4/2000 | Kinugasa et al. | 60/274 |
| 6,739,125 B1 | 5/2004 | Mulligan | |
| 6,810,658 B2 | 11/2004 | Kaupert et al. | |
| 6,845,610 B2 | 1/2005 | Shiino et al. | |
| 6,895,746 B2 | 5/2005 | Buglass et al. | |
| 6,964,156 B2 | 11/2005 | Liu et al. | |
| 7,334,400 B2 * | 2/2008 | Yan et al. | 60/286 |
| 7,402,292 B2 * | 7/2008 | Hemingway et al. | 423/239.1 |
| 7,485,272 B2 * | 2/2009 | Driscoll et al. | 423/213.2 |
| 7,571,602 B2 * | 8/2009 | Koch | 60/286 |
| 2005/0138916 A1 * | 6/2005 | Bonadies et al. | 60/275 |
| 2005/0274104 A1 | 12/2005 | Bromberg et al. | |
| 2006/0048502 A1 | 3/2006 | Washington et al. | |
| 2006/0096275 A1 * | 5/2006 | Robel et al. | 60/286 |
| 2007/0079603 A1 * | 4/2007 | Hu et al. | 60/288 |
| 2007/0130915 A1 * | 6/2007 | Beckmann et al. | 60/285 |

* cited by examiner

*Primary Examiner*—Wayne Langel
*Assistant Examiner*—Brittany M Martinez
(74) *Attorney, Agent, or Firm*—Finnegan, Henderson, Farabow, Garrett & Dunner, LLP; Jeff Ruppel

(57) ABSTRACT

A method of ammonia production for a selective catalytic reduction system includes producing a first exhaust flow and a second exhaust flow. The first exhaust flow has a higher NOx concentration than the second exhaust flow. The method also includes directing a portion of the second exhaust flow to a reformer. The method further includes combining the portion of the second exhaust flow directed to the reformer with the first exhaust flow upstream of an ammonia-producing catalyst.

17 Claims, 1 Drawing Sheet

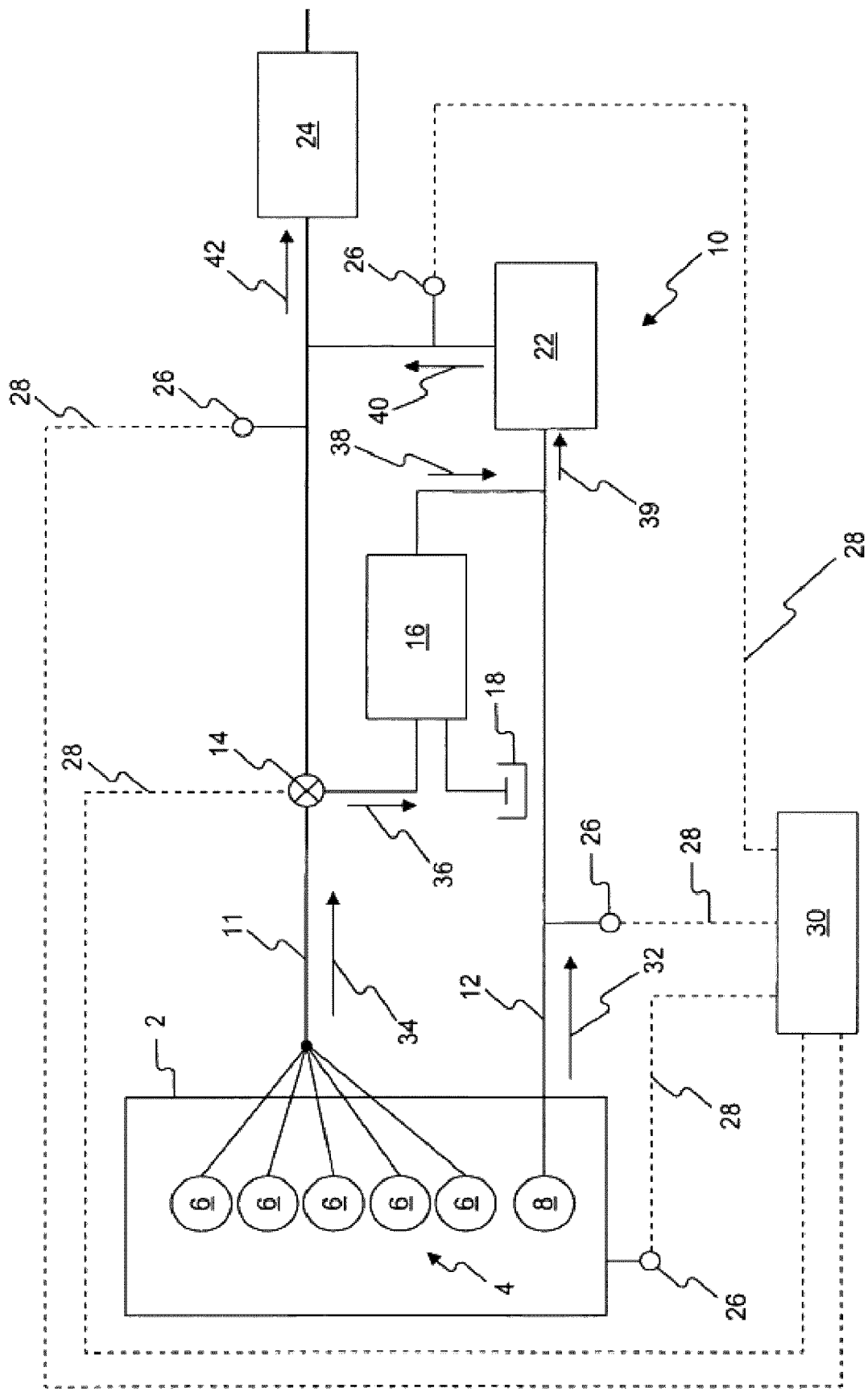

SYSTEM AND METHOD FOR AMMONIA PRODUCTION

TECHNICAL FIELD

This disclosure pertains generally to exhaust-gas purification systems for engines and, more particularly, to selective catalytic reduction systems with on-board ammonia production.

BACKGROUND

Selective catalytic reduction (SCR) provides a method for removing nitrogen oxides (NOx) emissions from fossil fuel powered systems for engines, factories, and power plants. During SCR, a catalyst facilitates a reaction between exhaust-gas ammonia and NOx to produce water and nitrogen gas, thereby removing NOx from the exhaust gas.

The ammonia that is used for the SCR system may be produced during the operation of the NOx-producing system or may be stored for injection when needed. Because of the high reactivity of ammonia, storage of ammonia can be hazardous. Further, on-board production of ammonia can be costly and may require specialized equipment.

One system for on-board ammonia production is disclosed in U.S. Pat. No. 5,964,088, issued to Kinugasa on Oct. 12, 1999 ("the '088 patent"). The system of the '088 patent includes an engine having first and second cylinder groups being connected to first and second exhaust passages. The first exhaust passage includes an ammonia ($NH_3$) synthesizing catalyst, and the two exhaust passages are merged downstream at an interconnecting exhaust passage, which includes an exhaust purifying catalyst. An additional engine, which performs a rich operation, is provided, and the exhaust gas from the additional engine is fed to the first exhaust passage upstream of the ammonia synthesizing catalyst to make the exhaust gas air-to-fuel ratio of the exhaust gas flowing into the ammonia synthesizing catalyst rich to thereby synthesize ammonia.

While the method of the '088 patent may reduce NOx from an exhaust stream through use of on-board ammonia production, the method of the '088 patent has several drawbacks. For example, the method of the '088 patent requires additional system components configured to supply oxygen and/or water during the ammonia production process. These components may increase the size, weight, complexity, and/or cost of the ammonia production system.

The present disclosure is directed at overcoming one or more of the shortcomings of the prior art ammonia production systems.

SUMMARY OF THE INVENTION

According to an exemplary embodiment of the present disclosure, a method of ammonia production for a selective catalytic reduction system includes producing a first exhaust flow and a second exhaust flow. The first exhaust flow has a higher NOx concentration than the second exhaust flow. The method also includes directing a portion of the second exhaust flow to a reformer. The method further includes combining the portion of the second exhaust flow directed to the reformer with the first exhaust flow upstream of an ammonia-producing catalyst.

According to another exemplary embodiment of the present disclosure, a method of ammonia production for a selective catalytic reduction system includes operating at least one cylinder of a power source in a lean operating condition and directing an exhaust flow of the at least one cylinder to an ammonia-producing catalyst. The method also includes directing a portion of an exhaust flow of a remainder of cylinders to a reformer.

According to yet another exemplary embodiment of the present disclosure, a system for on-board ammonia production includes a power source including a plurality of cylinders, and a reformer configured to receive a portion of an exhaust flow from a first group of the plurality of cylinders. The system also includes an ammonia-producing catalyst configured to receive a flow of exhaust from a second group of the plurality of cylinders. The reformer is configured to direct a flow of reformate to the ammonia-producing catalyst.

BRIEF DESCRIPTION OF THE DRAWINGS

The FIGURE illustrates an ammonia production system, according to an exemplary embodiment of the present disclosure.

DETAILED DESCRIPTION

The FIGURE illustrates an on-board ammonia production system 10, according to an exemplary disclosed embodiment. The ammonia production system 10 includes a cylinder group 4 of a power source 2, a reformer 16, an additive supply device 18, an ammonia-producing catalyst 22, and a controller 30 Ammonia produced from NOx at the ammonia-producing catalyst 22 may be used to control NOx emissions using an SCR system 24.

To improve the control of NOx emission using the SCR system 24, it may be desirable to streamline or optimize ammonia production by the on-board ammonia production system 10. Ammonia production may be streamlined or optimized by, for example, utilizing oxygen and water carried by a portion of a flow of exhaust gas from the power source 2. As will be described below, utilizing the oxygen and water contained within the exhaust gas may eliminate the need for, for example, an on-board air pump configured to supply ambient air to the reformer 16, and an on-board water supply configured to direct water to the reformer 16. Thus, utilizing the oxygen and water contained within the exhaust gas may reduce the cost, complexity, weight, and size of the ammonia production system 10.

The power source 2 may be any conventional power source having at least two cylinders, such as, for example, an internal combustion engine. Such engines may be, for example, spark ignition engines, compression ignition engines, and/or other types of engines known in the art. The cylinder group 4 may include cylinders 6, 8 of any conventional size, and the cylinder group 4 may include any suitable number of cylinders. As shown in the FIGURE, an exemplary cylinder group 4 of the present disclosure may include six cylinders 6, 8. In other embodiments, however, cylinder group 4 of the power source 2 may include two cylinders, three cylinders, four cylinders, or eight or more cylinders.

The operational parameters of the cylinder group 4 may be selected and/or controlled to produce a desired amount of NOx and/or other chemical species. The specific cylinder group size, number, and/or operational parameters may be selected based on cost, fuel-efficiency, desired amount of NOx and/or ammonia production, space considerations, and/or any other suitable factor. For example, a variety of different temperatures, compression ratios, air-to-fuel ratios, combustion strategies, and/or fuel additives may be used to control NOx production within one or more cylinders 6, 8 of the cylinder group 4.

The operation of the cylinder group 4 may be dependant on the ratio of air-to-fuel vapor that is injected into the cylinders 6, 8 during operation. The air-to-fuel vapor ratio is often expressed as a lambda value, which is derived from the stoichiometric air-to-fuel vapor ratio. The stoichiometric air-to-fuel vapor ratio is the chemically correct ratio for combustion to take place. A stoichiometric air-to-fuel vapor ratio may be considered to be equivalent to a lambda value of 1.0. Thus, an engine cylinder with a relatively low air-to-fuel vapor ratio has a lambda value less than 1.0 and is said to be rich, and an engine cylinder with a relatively high air-to-fuel vapor ratio has a lambda value greater than 1.0 and is said to be lean.

The lambda value may affect cylinder NOx production and fuel efficiency. For example, a lean-operating cylinder may have better fuel efficiency as compared to a cylinder operating under stoichiometric or rich conditions. Further, lean operation within the cylinder may affect the NOx production of that cylinder. However, lean operation may also decrease the efficiency of NOx-to-ammonia conversion at the ammonia-producing catalyst 22.

In an embodiment of the present disclosure, at least one lean cylinder 8 of the cylinder group 4 may be controlled to operate with a lean air-to-fuel ratio (for example, a lambda value of approximately 1.0), thereby increasing the amount of NOx produced by that lean cylinder 8. It is understood that peak NOx output may occur when the cylinder is operating just lean of the stoichiometric operating condition (for example, a lambda value of approximately 1.01 to approximately 1.02) due to in-cylinder temperatures. The specific operational lambda value of the lean cylinder 8 may be selected based on a desired amount of NOx production, desired fuel efficiency, or any other suitable factor. In some embodiments, the air-to-fuel ratio of the lean cylinder 8 may be between about 1.0 and about 1.3. In such an embodiment, the desired lean cylinder air-to-fuel ratio may be achieved through various valve timing and/or fuel injection strategies. In addition, it is understood that the remainder of the cylinders 6 of the cylinder group 4 may be controlled to operate at conditions where lambda is greater than the lambda of cylinder 8 (thus producing relatively less NOx), while the cylinder 8 is operated with a lean air-to-fuel ratio near to the stoichiometric point.

The lean cylinder 8 may be fluidly connected to the SCR system 24 by a high NOx exhaust line 12, and the remainder of the cylinders 6 may be fluidly connected to the SCR system 24 by a normal NOx exhaust line 11. The exhaust lines 11, 12 may be any type of tubing, piping, or hose known in the art, and the high NOx exhaust line 12 may be mechanically similar to the normal NOx exhaust line 11. The exhaust lines 11, 12 may be, for example, plastic, rubber, aluminum, copper, steel, or any other material capable of transmitting a high temperature flow of exhaust gas, and the exhaust lines 11, 12 may be flexible or rigid.

A flow control valve 14 may be fluidly connected to the normal NOx exhaust line 11 and configured to direct a slip stream of exhaust from the cylinders 6 to the reformer 16. As used herein, the term "slip stream" means a portion of the total exhaust flow emitted by the cylinders 6 of the cylinder group 4. The flow control valve 14 may be any type of controllable two-way or three-way valve known in the art. In an exemplary embodiment of the present disclosure, the flow control valve 14 may be, for example, a poppet valve, butterfly valve, controllable membrane, or any other type of controllable flow regulation device known in the art. For example, the flow control valve 14 may be controlled to allow any range of exhaust gas to pass from the cylinder group 4 to the reformer 16. The flow control valve 14 may be controlled by any conventional control mechanism (not shown), including, for example, an electric, piezoelectric, pneumatic, hydraulic, or other controller. In some embodiments, the control mechanism may include a solenoid, servo motor, or other conventional means, and the control mechanism of the flow control valve 14 may be electrically connected to the controller 30 by a control line 28.

The additive supply device 18 may be configured to supply fuel, reductants, and/or other additives to the reformer 16 and/or a flow of exhaust gas. The additive supply device 18 may include a variety of conventional supply devices, including an injector, flow valves, a pump, and an additive storage tank or sump. In an exemplary embodiment of the present disclosure, a component of the additive supply device 18 may be fluidly connected to a fuel tank and/or a pressurized fuel line of the machine being powered by the power source 2.

The ammonia-producing catalyst 22 may be selected from a number of suitable catalyst types and may include a variety of catalytic and/or reactive materials. In an exemplary embodiment, the ammonia-producing catalyst 22 may include at least one of platinum, palladium, rhodium, iridium, copper, chrome, vanadium, titanium, iron, and cesium. It is understood that the ammonia-producing catalyst 22 may include any combination of these or other materials, and the catalyst materials may be chosen based on cost, the type of fuel used, the air-to-fuel vapor ratio desired, and/or for conformity with environmental standards. The type, materials, configuration, and/or other characteristics of the ammonia-producing catalyst 22 may also be selected based on its ability to control NOx-to-ammonia conversion efficiency, selectivity to $NH_3$, the amount of NOx produced by the lean cylinder (or cylinders) 8, and/or the catalyst temperature under selected operating conditions.

It is understood that the operation of the ammonia-producing catalyst 22 may be affected by a variety of different factors, such as, for example, the presence of other chemicals in the flow exhaust gas, catalyst temperature, and/or contamination of the ammonia-producing catalyst 22 with exhaust gas chemicals. In some embodiments of the present disclosure, the temperature of ammonia-producing catalyst 22 may be controlled by, for example, cooling the flow of exhaust gas with a cooling system (not shown). In addition, the presence of other chemical species in flow of exhaust gas may be controlled by, for example, controlling the operation of the lean cylinder 8 and/or using one or more additional catalysts located upstream of ammonia-producing catalyst 22.

The reformer 16 may be any device capable of converting additives, such as, for example, hydrocarbon fuels or alcohol fuels, into hydrogen-rich reformate in a catalytic partial oxidation process. The reformer 16 may be any type of fuel reformer known in the art, such as, for example, a catalyst-based reformer or a plasma-based reformer. In an embodiment in which the reformer 16 is a catalyst-based reformer, the ammonia production system 10 may further include a heat source (not shown) configured to increase the temperature of a portion of the reformer 16, such as, for example, an inlet of the reformer 16, to temperatures in excess of 300 degrees Celsius. Alternatively, an inlet of the reformer 16 may be disposed proximate one or more relatively high temperature components of the ammonia production system 10 (such as, for example, the exhaust lines 11, 12) such that heat exchange can occur between the one or more components and the reformer inlet. In such an embodiment, the heat source may be omitted.

The reformer 16 may be of any size, shape, and/or capacity suitable for the production of a desirable amount of reformate in the ammonia production system 10, and the reformer 16 may be configured to convert additives to reformate using oxygen contained within a slip stream of exhaust from the cylinders 6 of the cylinder group 4. As shown in the FIGURE, the reformer 16 may be fluidly connected to the high NOx exhaust line 12 upstream of the ammonia-producing catalyst 22 such that reformate produced by the reformer 16 may be transmitted to the ammonia-producing catalyst 22 during operation of the ammonia production system 10.

In an exemplary embodiment of the present disclosure, the ammonia production system 10 may include one or more diagnostic devices 26. The diagnostic devices 26 may be, for example, part of the machine or other device to which the power source 2 is connected. The diagnostic devices 26 may be any sensing devices known in the art, such as, for example, NOx sensors, temperature sensors, flow meters, emission meters, pressure transducers, radio devices, or other sensors. Such diagnostic devices 26 may sense, for example, the levels of soot, NOx, or other pollutants in an exhaust flow of the power source 2. The diagnostic devices 26 may send pollutant level information to, for example, the controller 30 via one or more control lines 28 and may assist in, for example, controlling the amount of hydrogen-based reformate produced by the reformer 16. For example, a diagnostic device 26 may be fluidly connected to the high NOx exhaust line 12 downstream of the lean cylinder 8. NOx levels and/or other information sensed by this diagnostic device 26 may be used by the controller 30 to regulate, for example, the slip stream of exhaust and the flow of additives sent to the reformer 16. Thus, the diagnostic device 26 of this exemplary embodiment may assist in regulating the reaction between the additives and the components of the slip stream across the reformer 16, and may thereby assist in controlling the amount of reformate produced by the reformer 16. In an exemplary embodiment, the reformer 16 may be controlled to produce an approximately stoichiometric amount of hydrogen according to the following equation: $2NO+3H_2=2NH_3+O_2$. It is understood, however, that it may be desirable to supply more than the stoichiometric amount of hydrogen to the ammonia-producing catalyst 22 to ensure a sufficient level of ammonia formation.

The controller 30 may be, for example, a central processing unit, an electronic control module, a computer, a radio transmitter, or any other type of controller known in the art. The controller 30 may be connected to an operator interface (not shown), such as, for example, a keyboard, a mouse, a monitor, a touch screen, or any other device enabling a user to enter commands into and/or view or retrieve output from the controller 30. As shown in the FIGURE, the controller 30 may be electrically connected to one or more components of the ammonia production system 10 via control lines 28. As described above, the controller 30 may control aspects of the ammonia production process in response to signals received from the diagnostic devices 26. The controller 30 may also be configured to store and manipulate data received therefrom.

The SCR system 24 may be configured to assist in reducing exhaust gas NOx emissions by converting NOx within the flow of exhaust to nitrogen, water, and/or other gases through catalytic reaction with ammonia. The ammonia production system 10 may be configured to produce a combined flow of exhaust having an ammonia-to-NOx ratio sufficient for the catalytic reactions within the SCR system 24. The SCR system 24 may include one or more components, such as a specialized catalytic converter. Such converters may include, for example, a vanadium-based catalyst or a catalyst with zeolites in the washcoat. In addition, some components of the SCR system 24 may require a relatively narrow temperature window for optimum NOx conversion. Thus, the SCR system 24 may also include, for example, a flow cooler (not shown) configured to maintain the temperature of the flow of exhaust gas passing through the SCR system 24 within a desired temperature range.

INDUSTRIAL APPLICABILITY

On-board ammonia production can provide an efficient method for reducing NOx emissions using SCR systems. However, the efficacy, efficiency, and cost effectiveness of on-board ammonia production may require improved methods for controlling the production of ammonia from exhaust gas NOx. The present disclosure provides a system and method for on-board ammonia production. The ammonia production system 10 may be used on-board any vehicle powered by a power source 2 that emits exhaust containing NOx.

During an exemplary operation of the ammonia production system 10, the power source 2 may be controlled such that a lean cylinder 8 may supply an exhaust flow 32 containing a high level of NOx to the ammonia-producing catalyst 22 while the remainder of the cylinders 6 of the cylinder group 4 are operated under normal engine conditions. The exhaust flow 34 produced by the remainder of the cylinders 6 may be directed toward the SCR system 24 via the normal NOx exhaust line 11. In an exemplary embodiment, the volumetric flow rate of the exhaust flow 34 may be greater than the volumetric flow rate of the exhaust flow 32. Alternatively, the volumetric flow rate of the exhaust flow 32 may be greater than the volumetric flow rate of the exhaust flow 34. A diagnostic device fluidly connected to the high NOx exhaust line 12 may sense the level of NOx emitted by the lean cylinder 8 and may transmit this information to the controller 30. The controller 30 may enter this information into a preset algorithm and may calculate, for example, the slip stream flow and additive flow required to produce a desired amount of reformate at the reformer 16. The controller 30 may control, for example, the flow control valve 14 and/or components of the additive supply device 18 to yield the desired amount of reformate. The desired amount of reformate may correspond to a substantially stoichiometric amount of hydrogen required to react with the high NOx exhaust at the ammonia-producing catalyst 22. It is understood, however, that the components of the ammonia production system 10 may be controlled to maximize the ammonia formed by the ammonia-producing catalyst 22 and that in order to maximize the production of ammonia, more than a stoichiometric amount of reformate may be produced by the reformer 16.

The flow control valve 14 may direct the slip stream 36 to the reformer 16 and an exhaust flow 38 containing a relatively higher concentration of hydrogen, hydrocarbons, and carbon monoxide, and a relatively lower concentration of water and oxygen may pass from the reformer 16 to the high NOx exhaust line 12. The exhaust flow 38 may combine with the exhaust flow 32 from the lean cylinder 8 upstream of the ammonia-producing catalyst 22 to form a mixed flow 39. To optimize ammonia production in an exemplary embodiment, the mixed flow 39 may have an overall composition such that its measured lambda is less than 1. In such an exemplary embodiment, the amount of reductants from flow 38 plus flow 32 is greater than the amount of oxidants from flow 38 plus flow 32. The mixed flow 39 may then pass to the ammonia-producing catalyst 22, where its components may react with the catalyst materials therein to form ammonia. An exhaust flow 40 may then pass from the ammonia-producing catalyst 22 to the normal NOx exhaust line 11, where it may combine with the exhaust flow 34 from the cylinders 6 upstream of the SCR system 24 to form a mixed flow 42. The mixed flow 42 containing ammonia may represent the total exhaust flow of the power source 2. The mixed flow 42 may then enter the SCR system 24, where the ammonia carried by the mixed flow 42 may react with the NOx in the presence of the catalyst materials of the SCR system 24 to produce nitrogen and water.

According to the disclosed system and method, reformate may be produced using oxygen contained in the slip stream 36. As described above, the reformer 16 may require a supply of water, oxygen, and hydrocarbons to produce hydrogen-rich reformate for ammonia production in the ammonia-producing catalyst 22. The slip stream 36 may contain approximately 10% water and approximately 8% oxygen. Thus, supplying the reformer 16 with the slip stream 36 of exhaust may eliminate the need for an air pump and/or water source on-board the machine. In addition, by converting NOx contained in the slip stream 36 at the reformer 16, the total amount of NOx that must be acted on by the SCR system 24 is decreased.

Moreover, by using a reformer 16 to produce reformate from hydrocarbons in additives such as, for example, diesel fuel, the ammonia production system 10 of the present disclosure may minimize the drawbacks of current devices that utilize, for example, diesel fuel as agents in the ammonia-producing catalyst 22. Such systems may convert a substantial portion of the NOx carried in the exhaust of the high NOx exhaust line 12 to $N_2$ and $O_2$. This conversion of NOx upstream of the ammonia-producing catalyst 22 may decrease the formation of ammonia at the ammonia-producing catalyst 22. The use of a reformer 16, however, may eliminate the problem of reacting substantially all of the NOx carried by the high NOx exhaust line 12.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A method of ammonia production for a selective catalytic reduction system, comprising:
   producing a first exhaust flow and a second exhaust flow, the first exhaust flow having a higher NOx concentration than the second exhaust flow;
   directing a portion of the second exhaust flow to a reformer;
   producing reformate in said reformer; and
   combining exhaust flow from the reformer and the reformate with the first exhaust flow upstream of an ammonia-producing catalyst.

2. The method of claim 1, further including combining an output flow of the ammonia-producing catalyst with the second exhaust flow upstream of the selective catalytic reduction system.

3. The method of claim 1, wherein a volumetric flow rate of the first exhaust flow is less than a volumetric flow rate of the second exhaust flow.

4. The method of claim 1, wherein producing a first exhaust flow includes controlling at least one cylinder of a power source to operate in a lean condition.

5. The method of claim 1, further including sensing a NOx concentration of the first exhaust flow.

6. The method of claim 5, further including controlling the flow of the portion of the second exhaust flow to the reformer based on the sensed NOx concentration of the first exhaust flow.

7. The method of claim 6, further including directing a flow of an additive to the reformer based on the sensed NOx concentration, the flow of the portion, or both.

8. The method of claim 1, further including producing at least a stoichiometric amount of reformate for reaction with the first exhaust flow.

9. The method of claim 1, further including reacting the portion of the second exhaust flow with a flow of additive at the reformer to produce a reformate containing hydrogen.

10. A method of ammonia production for a selective catalytic reduction system, comprising:
    operating at least one cylinder of a power source in a lean operating condition;
    directing an exhaust flow of the at least one cylinder to an ammonia-producing catalyst;
    directing a portion of an exhaust flow of a remainder of cylinders to a reformer to produce an exhaust flow containing exhaust gas and reformate, the exhaust flow of the lean operating cylinder having a higher NOx concentration than the exhaust flow of the remainder of cylinders; and
    directing the exhaust flow containing exhaust gas and reformate to the ammonia-producing catalyst.

11. The method of claim 10, further including combining the portion of the exhaust flow of the remainder of cylinders and the exhaust flow of the at least one cylinder upstream of the ammonia-producing catalyst.

12. The method of claim 10, further including combining an output flow of the ammonia-producing catalyst with the exhaust flow of the remainder of cylinders upstream of the selective catalytic reduction system.

13. The method of claim 10, further including sensing a NOx concentration of the exhaust flow of the at least one cylinder.

14. The method of claim 13, further including controlling the flow of the portion of the exhaust flow to the reformer based on the sensed NOx concentration.

15. The method of claim 14, further including directing a flow of an additive to the reformer based on the sensed NOx concentration, the flow of the portion, or both.

16. The method of claim 10, further including producing at least a stoichiometric amount of reformate for reaction with the exhaust flow of the at least one cylinder.

17. The method of claim 10, further including reacting the portion of the exhaust flow of the remainder of cylinders with a flow of additive at the reformer to produce a reformate containing hydrogen.

* * * * *